Patented Aug. 28, 1945

2,383,914

UNITED STATES PATENT OFFICE 2,383,914

PRODUCTION OF STARCH CONVERSION SIRUPS

Richard Nicholas Monte, Cincinnati, Ohio, assignor to Corn Products Refining Company, New York, N. Y., a corporation of New Jersey No Drawing. Application November 6, 1943, Serial No. 509,279

7 Claims. (Cl. 127—38)

This invention relates to the production of sirups by the conversion of starch, notably corn starch, and concerns, more particularly, an improved process for the production of starch conversion sirups by acid hydrolysis.

It has long been known in the art to produce starch conversion sirups by acid hydrolysis. The corn sirups of commerce have for many years been produced in this way, i. e., by hydrolyzing starch, preferably under pressure and at elevated temperatures, in the presence of mineral acid catalysts such as hydrochloric acid or sulfuric acid, until the desired degree of conversion has been effected.

In the production of starch conversion sirups, it has long been the aim to achieve a relatively high degree of sweetness to the taste. To this end, attempts have been made to carry the conversion forward to the greatest degree consistent with acceptable taste in the finished product. The limiting factor in this connection, however, has been the fact that while extended conversion tends to increase the sweetness of the resultant sirup, it tends also, when conversion is carried beyond a certain point, to bring about a bitter taste in the resultant sirup. For this reason, it has generally been the commercial practice, at least as concerns the production of edible starch conversion sirups, to carry the acid hydrolysis of starch only to the point at which the resultant sirup has a D. E. or dextrose equivalent of about 42%–45%. (By percent D. E. or dextrose equivalent is meant the percentage of total reducing sugars calculated as dextrose, as determined in conventional manner by copper reduction.)

Such sirups have not been particularly sweet to the taste. Recognition of this fact and a desire to increase the sweetness of such sirups have prompted various attempts to increase the D. E. and sweetness of starch conversion sirups, without, however, impairing the taste thereof by introducing an element of bitterness. Thus it has been proposed, for example, to produce sweet starch conversion sirups by subjecting starch to acid conversion to produce a liquor having a dextrose equivalent content of between 25% and 55% and thereafter subjecting such liquor to the action of a saccharifying enzyme to produce a sirup having a dextrose equivalent content of 55% to 75% (U. S. Patent No. 2,201,609). However, prior attempts to produce relatively sweet syrups of acceptable taste have not been wholly satisfactory. Some have failed to produce sirups having the desired characteristics and others, while satisfactory in this respect, have involved complicated, time-consuming and expensive procedures.

The present invention provides an improved process for the production, in a simple and inexpensive manner, of starch conversion sirups of sweet taste and relatively high D. E. content which are entirely palatable and substantially entirely free from bitterness. As will appear, the present invention makes it possible to produce such sirups by a process of acid hydrolysis.

In practicing this invention, starch, e. g., corn (maize) starch, which is to be converted is suspended in water to form a slurry into which there is mixed a small amount of an activated carbon of vegetable origin in the form of small particles. There is also admixed with the slurry a sufficient amount of acid, e. g., hydrochloric acid, to catalyze hydrolysis of the starch in conventional manner. The starch suspension thus prepared is subjected to the action of steam at superatmospheric pressure in an autoclave or the like, until the dextrose equivalent content of the resultant sirup is about 56%–60%. The conversion is then arrested by relieving the pressure and raising the pH of the mixture, and the sirup is thereafter filtered, refined and concentrated in conventional manner. Sirups produced in accordance with the invention have been found exceedingly palatable and free from bitterness, whereas sirups produced in conventional manner under identical conditions, save as regards the presence of the activated carbon of vegetable origin, have been found materially inferior.

In preparing the starch slurry for conversion, any desired starch concentration may be employed, as from about 20°–24° Baumé. As is well understood in the art, the conversion of starch, in water suspension of given concentration, by acid hydrolysis, depends within well recognized limits, upon the interrelated factors of steam pressure (temperature), time, and acid concentration. Thus, for a given steam pressure a decrease in acid concentration will require conversion for a longer period to produce a given dextrose equivalent content in the resultant sirup; and, correspondingly, an increase in acid concentration permits the desired degree of conversion to be effected within a shorter period. Similarly, the steam pressure at which conversion is effected influences the time and/or acid concentration required to produce a sirup of given dextrose equivalent content, the higher the pressure at which conversion is effected, the less time and/or acid being required, and vice versa. These principles, well known to those familiar with the production of sirups by acid hydrolysis of starch, apply as fully to the present invention as in the case of conventional acid hydrolysis, it being understood, however, that the present invention involves the use of superatmospheric steam pressures. Preferably, steam pressures of from 30–45 pounds per square inch are employed, and under such conditions the acid concentration of the slurry is preferably 0.012–0.018 N when hydrochloric acid is employed as the catalyst, 0.015 N being the optimum acid concentration. When a 20°–24° Baumé starch suspension is subjected to conversion under such conditions of steam pressure and acidity, it will be found that it requires about 8–12 minutes to convert the starch suspension to a sirup having the desired dextrose equivalent content of 56–60% which is contemplated by the present invention.

The activated carbon of vegetable origin is employed in finely divided or powdered form and is preferably used to the extent of about 0.5% to about 1% by weight based on the starch dry substance. Smaller amounts have been found ineffective for the purposes of the present invention, and larger amounts, while they may be used, appear to contribute little if anything to the attainment of the desired results. As has been indicated, any activated carbon of vegetable origin may be used, and among these may be mentioned, by way of example, those materials known to the trade as Darco S 51, Darco K W, Darco K A, and Nuchar W A. The activated carbon should be used in the form of particles which are at least sufficiently small to pass through a 200 mesh screen. This is the physical form in which such materials are conventionally sold for and used in sugar liquor decolorizing operations and the like.

The pH of the converted starch liquor is adjusted to about 4.2–4.4. Such adjustment of the pH is preferably effected by neutralization with soda ash or the like, but may be otherwise effected if desired, as by means of ion exchange treatment as disclosed in U. S. Patent to Cantor No. 2,328,191.

Following such neutralization, or equivalent, the sirup is subjected to a filtering or comparable clarifying step to remove the carbon and other solid materials. It is then concentrated, preferably to about 30°–32° Baumé, is then subjected to a carbon decolorizing treatment, and is then finally treated by concentration to about 39.5° to about 43° Baumé. It has been found that starch liquor converted in accordance with the invention may be effectively filtered and refined at pH 4.2–4.4, whereas it has generally been thought necessary in prior practice to neutralize to a pH approximating 4.8 to 5.0 in order to carry forward effectively the filtering steps essential to the production of satisfactory starch conversion sirups. Adjustment of the pH of the conversion liquor 4.2–4.4 appears to have an important and favorable bearing upon the taste of the finished sirup, its color, and its keeping qualities.

In carrying out the present invention, it is important that the acid hydrolysis be carried to the degree necessary to produce a sirup having a dextrose equivalent content between about 56% and about 60%, a D. E. of 58% being preferred. If the conversion is not carried to a point within this limited range, the resultant sirup will be markedly unsatisfactory as concerns either sweetness if the conversion is not carried sufficiently far, or bitterness if the conversion be carried beyond the specified range. The effects of deviation from this range are both sharp and pronounced to an unexpected degree, particularly with respect to the bitter taste which results from exceeding the upper limit of such range.

While the invention has been described, with particular reference to the use of hydrochloric acid, it will be apparent to those skilled in the art that sulfuric acid or other acids conventionally used to catalyze the hydrolysis of starch may also be used in appropriate concentrations. If sulfuric acid be employed as the acid catalyst, it will be found that the conversion tends to proceed more slowly than when hydrochloric acid is used. Accordingly, if conversion to the desired degree is to be effected, under the conditions and in the time specified above, using sulfuric acid as the catalyst, the normality of the acidified slurry should be somewhat increased. Similarly, neutralization of the acid catalyst may be effected by use of any appropriate alkali, e. g., soda ash, sodium carbonate, calcium hydroxide, calcium carbonate, etc., it being understood that the selection of suitable acids and alkalis lies well within the province of those skilled in the art of acid hydrolysis of starch, and forms no part, per se, of the present invention.

Sirups produced in accordance with the invention have been found most acceptable for use as table sirups and the like, for general cooking purposes, and in the manufacture of food products such as confections and pastries. The clarity and brilliance of such sirups, their light color, pleasant taste and sweetness make them exceedingly desirable for these and related uses.

I claim:

1. In the production of starch conversion sirup by acid hydrolysis of starch in aqueous suspension at superatmosphereic steam pressure, the improvement which consists in contacting the suspension undergoing conversion with an effective amount, not less than about 0.5% by weight based on starch dry substance, of activated carbon of vegetable origin, and arresting the conversion when the conversion liquor has attained a D. E. of about 56% to about 60%, said activated carbon being in finely divided form.

2. The process according to claim 1 wherein said activated carbon is in the form of particles sufficiently fine to pass through a 200 mesh screen.

3. The process of producing sweet sirup substantially free from bitterness of taste, by conversion of starch, which comprises acid hydrolyzing, at superatmospheric steam pressure, starch in water suspension to a D. E. of about 56% to about 60%, the starch undergoing conversion being subjected to contact with activated carbon of vegetable origin in the form of finely divided particles, present to the extent of about 0.5% to about 1% based on the weight of the starch dry substance.

4. The process of producing sweet sirup substantially free from bitterness of taste, by conversion of starch, which comprises acid hydrolyzing, at superatmospheric steam pressure, starch in water suspension to a D. E. of about 56% to about 60%, the starch undergoing conversion being subjected to contact with an effective amount, not less than about 0.5% by weight based on starch dry substance, of finely divided activated carbon of vegetable origin, and upon completion of the conversion to the desired degree adjusting the pH of the conversion liquor to about 4.2 to about 4.4.

5. The process according to claim 4 wherein hydrochloric acid is employed as a catalyst and wherein, subsequent to conversion to the desired D. E., the conversion liquor is neutralized with soda ash to pH 4.2–4.4.

6. The process of producing a sweet and pleasant tasting starch conversion sirup which comprises mixing with an aqueous starch suspension of approximately 20° to 24° Baumé, about 0.5% to about 1%, based on starch dry substance, of finely divided activated carbon of vegetable origin, and hydrochloric acid in amount sufficient to render the acid concentration of the suspension about 0.012 to 0.018 N, subjecting the suspension to conversion at a steam pressure of about 30 to 45 pounds per square inch, for a period of time sufficient to yield a conversion sirup having a D. E. of about 56%–60%, then arresting the converting action, and refining and concentrating the resultant sirup.

7. The process of producing a sweet and pleasant tasting sirup by conversion of starch which comprises forming a starch suspension in water of about 20°–24° Baumé, admixing with the suspension about 0.5% to about 1%, based on weight of dry starch, of finely divided activated carbon of vegetable origin and hydrochloric acid in amount to impart to the suspension a normality of about 0.012–0.018, then subjecting the suspension to a steam pressure of about 30 to about 45 pounds per square inch until the liquor has attained a D. E. content of about 56%–60%, neutralizing the resultant sirup with soda ash to pH 4.2–4.4, and thereafter refining and concentrating the resultant sirup.

RICHARD NICHOLAS MONTE.